United States Patent
Kostka et al.

(10) Patent No.: US 11,230,947 B2
(45) Date of Patent: Jan. 25, 2022

(54) GAS TURBINE ENGINE HAVING OIL LEVEL MEASUREMENT SYSTEM

(71) Applicant: PRATT & WHITNEY CANADA CORP., Longueuil (CA)

(72) Inventors: Richard Kostka, Bolton (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 113 days.

(21) Appl. No.: 16/447,360

(22) Filed: Jun. 20, 2019

(65) Prior Publication Data

US 2020/0400070 A1 Dec. 24, 2020

(51) Int. Cl.
*F01D 25/18* (2006.01)

(52) U.S. Cl.
CPC .......... *F01D 25/18* (2013.01); *F05D 2260/80* (2013.01); *F05D 2260/98* (2013.01)

(58) Field of Classification Search
CPC .................................... F01D 25/18; F02C 7/06
See application file for complete search history.

(56) References Cited

U.S. PATENT DOCUMENTS

| | | | |
|---|---|---|---|
| 5,610,341 A * | 3/1997 | Tortora | F01D 17/02 73/756 |
| 7,931,124 B2 | 4/2011 | Glahn et al. | |
| 2009/0164056 A1 * | 6/2009 | Cornet | F01D 21/003 701/3 |
| 2011/0048856 A1 * | 3/2011 | Thivierge | F16H 57/0406 184/6.11 |
| 2012/0130617 A1 * | 5/2012 | Raimarckers | F01D 21/003 701/99 |
| 2013/0227960 A1 * | 9/2013 | Bonner | F02C 7/06 60/783 |
| 2014/0010639 A1 * | 1/2014 | Snape | F01D 25/18 415/177 |
| 2015/0075132 A1 * | 3/2015 | Kohn | B64D 47/00 60/39.08 |
| 2015/0260563 A1 * | 9/2015 | Venter | F16N 19/003 73/304 C |
| 2015/0316398 A1 * | 11/2015 | Pierrot | F16N 29/00 73/114.56 |
| 2016/0160714 A1 | 6/2016 | James | |
| 2017/0314474 A1 * | 11/2017 | Wotzak | F02C 7/32 |
| 2018/0087656 A1 | 3/2018 | Poster et al. | |
| 2020/0025033 A1 * | 1/2020 | White | F01M 11/0458 |

* cited by examiner

*Primary Examiner* — Woody A Lee, Jr.
(74) *Attorney, Agent, or Firm* — Norton Rose Fulbright Canada LLP

(57) ABSTRACT

The gas turbine engine can have an accessory gearbox having a sump; an oil tank; a user interface configured to generate a signal upon receiving a user input indicative of an oil measurement reading; and a pump configured to pump oil from the sump to the oil tank upon receiving the user input.

18 Claims, 2 Drawing Sheets

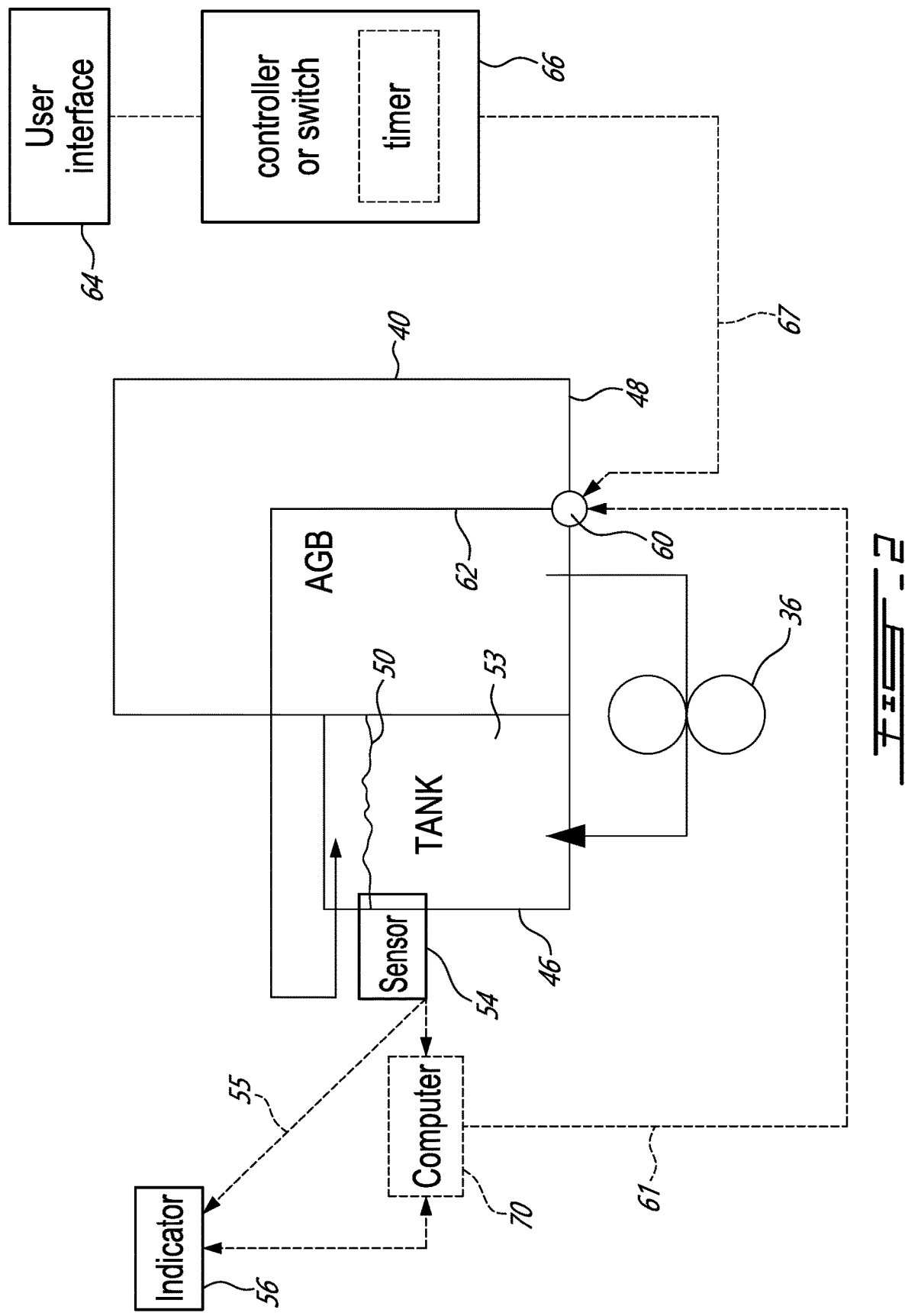

GAS TURBINE ENGINE HAVING OIL LEVEL MEASUREMENT SYSTEM

TECHNICAL FIELD

The application related generally to gas turbine engines and, more particularly, to oil level measurement thereof.

BACKGROUND OF THE ART

Some gas turbine engines have a sump located below the oil level of an oil tank. Oil can flow from the oil tank to the sump, which can bias the oil level reading. There remained room for improvement.

SUMMARY

In one aspect, there is provided a gas turbine engine having in serial flow communication a compressor section, a combustor and a turbine section, the gas turbine engine comprising: an accessory gearbox having a sump; an oil tank; a user interface configured to generate a signal upon receiving a user input indicative of an oil measurement reading; a pump configured to pump oil from the sump to the oil tank upon receiving the user input.

In another aspect, there is provided a method for performing maintenance on a gas turbine engine having a core gas path, an accessory gearbox having a sump, and an oil tank, the method comprising: pumping oil from the sump into the oil tank automatically i) while the core gas path of the gas turbine engine is not in operation, and ii) contingent upon the reception of a user input from a user interface, the user input being indicative of an oil measurement reading.

In a further aspect, there is provided an oil level measurement system for an engine having an oil sump positioned below the level of oil in an oil tank, the oil level measurement system comprising: a user interface configured to generate a signal upon receiving a user input indicative of an oil measurement reading; a pump configured to pump oil from the sump to the oil tank upon receiving the user input.

DESCRIPTION OF THE DRAWINGS

Reference is now made to the accompanying figures in which:

FIG. 2 is a schematic view of an oil measurement system in accordance with one embodiment.

DETAILED DESCRIPTION

Figure 1:
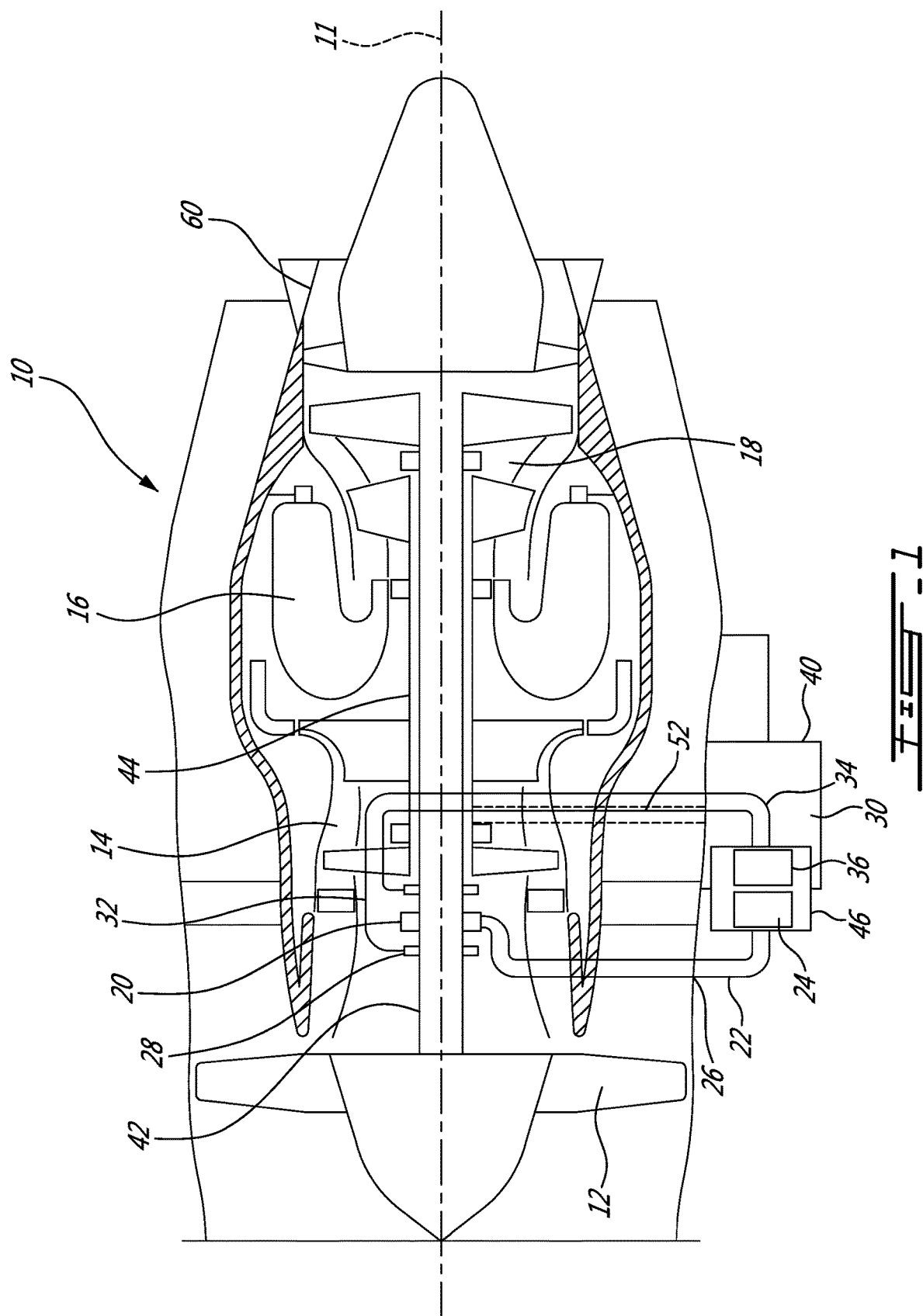
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts 42, 44. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20.

The gas turbine engine also has an accessory gearbox 40 which derives power from a corresponding one of the shafts 42, 44. The accessory gearbox 40 can be positioned in a lower portion of the gas turbine engine 10, and can have a sump 40 lower than the oil level 50 in an oil tank see FIG. 2. One or more intermediary shafts and gearing can provide power to the accessory gearbox 40. In this example, a vertical intermediary shaft 52 having gears engaged with corresponding gears on the corresponding compressor/turbine rotor can be engaged, in the accessory gearbox, with an output shaft (not shown), via appropriate gearing (not shown). The output shaft can power various accessories of the gas turbine engine, such as electrical generators, oil and fuel pumps, and hydraulic pumps through a gear train. The gear train can require oil for lubrication. The oil tank 46 can be external or internal.

The accessory gearbox 40 can be installed under the main engine casing, or at another low point on the engine architecture, and can have a sump which is positioned below the level 50 of the oil 53 in the oil tank 46. The oil tank can be attached to the AGB 40 or mounted above it onto the engine casing, to name two examples. A scavenge pump 36 can be used to pump oil from the sump 48 of the accessory gearbox 40 back into the oil tank 46. The scavenge pump 36 can be powered by the output shaft of the accessory gearbox 40.

The oil tank 46 can be equipped with an oil level sensor 54 which is operably connected via any suitable link 55 to an oil level indicator 56. Alternately, the oil level can be measured by removing a cap equipped with a metal feeler (not shown) which becomes partially covered by the oil, to an extent depending on the oil level, as well known in the art. The oil level indicator and the oil level sensor can take various forms. In one embodiment, the oil level indicator has a mechanical dial positioned visually accessible via a sight glass, the mechanical dial being mechanically connected to the oil sensor. In another embodiment, the oil level indicator can be an electronic display in the cockpit which is electrically or electronically, wiredly or wirelessly, connected to receive an oil level signal from the oil level sensor. Many variants are possible depending on engine and aircraft type.

Maintenance can be performed on the gas turbine engine 10 when the gas turbine engine 10 is not in operation. When the gas turbine engine 10 is not in operation, the compressor/turbine shafts 42, 44 do not rotate, and accordingly, no power is sent to the accessory gearbox 40, and the scavenge pump 36 is not in operation.

In these latter conditions, oil can leak from the oil tank 46 back to the accessory gearbox sump 48. This can occur via a worn seal, for instance. An oil level indicator 56 can be provided to show the oil level of the oil tank. The oil level indicator 56 can be visible through a sight glass which can be accessed by maintenance personnel, or at any suitable location on the aircraft.

If the maintenance personnel evaluates the level of the oil from the oil level indicator 56 while a substantial amount of oil has leaked from the oil tank 46 to the accessory gearbox sump 48, maintenance personnel may conclude that the level of oil 50 is lower than required, while the actual amount of oil, including the oil in the sump, is adequate. This can motivate maintenance personnel to add oil while additional oil is not required, and can lead to exceed the required level of oil, which can be undesirable for a variety of reasons.

FIG. 2 shows an example of a system which can be used to avoid such a situation. In this example, an auxiliary pump 60 is provided. The auxiliary pump 60 can be specifically powered to pump oil from the AGB sump 48 back to the oil tank 46 when an oil level reading is to be performed. The auxiliary pump 60 can be electrically powered, for instance, independently of the operation of the main gas path of the gas turbine engine 10. The auxiliary pump 60 can be associated to an auxiliary line 62 (oil conduit) which leads back to the oil tank 46, independently of the oil conduit of the scavenge pump 36, for instance.

A user interface 64 can be provided in a manner to allow a user to provide an input indicative that she will perform, or is performing, an oil level reading. The user interface 64 can take various forms, can be integrated to or provided separate from the oil indicator 56, and can involve complex electronics such as a touch screen or be very simple. An example of a user interface 64 is a lever or button controlling an electrical switch 66 operably connected to a cover of a sight glass which allows visual access to the oil level indicator. During an oil level reading, the maintenance personnel will necessarily raise the cover and therefore activate the switch 66. The switch 66 is connected to the pump 60 via any suitable link 67 and can trigger the operation of the pump 60. Another example of a user interface 64 is a lever or button operably connected to an oil filler cap, or to a door which allows access to the oil system for servicing, to name two additional examples, or to still another moveable component which is moved by maintenance personnel in association with performing an oil reading. The user interface 64 can also simply be a push button which maintenance personnel depresses when they are about to perform an oil reading, to name still another example. Still another example of a user interface 64 is a movement detector which detects the presence of maintenance personnel via their movement when maintenance is being performed.

The control of the auxiliary pump 60 can be relatively straightforward or more complex depending on the embodiment. The component which controls the operation of the auxiliary pump 60 can be referred to as a controller for the sake of simplicity, and can involve a simple electrical switch, more complex electronics such as a timer, and even a standalone computer with a processor and non-transitory memory.

In a context where the auxiliary pump 60 is powered by the aircraft's electrical supply, it can be preferable to limit the electricity usage. To this end, the user interface 64 can be used to trigger a timer, which monitors a given period of time during which the auxiliary pump 60 is to remain in activation, and then automatically interrupt the activation of the auxiliary pump. A required minimal amount of time of activation corresponding to a worst-case scenario can be calibrated by testing. A worst-case scenario can correspond to a scenario where the oil 53 in the tank has leaked to the extent where the level 50 of oil in the oil tank is equal to the level of oil in the auxiliary gearbox 40. One can calculate the amount of time of auxiliary pump activation required to fully empty the AGB 40 in this scenario, and use this calculated amount of time to program the timer, for instance.

Such a system can also be useful to a pilot sitting a cockpit, for instance. Accordingly, the oil level indicator 56, and/or the user interface 64, can alternately be in the cockpit in a manner to allow the pilot to have an accurate reading of the oil level before engaging the gas turbine engines into operation, for instance. In the context of a cockpit application, a computer 70 can control a visual indicator available to the pilot based on a pilot input, and the computer 70 can automatically control via any suitable link 61 the auxiliary pump 60 based on a user input from the pilot indicative of a request to display the oil level.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine having in serial flow communication a compressor section, a combustor and a turbine section, the gas turbine engine comprising:
   an accessory gearbox having a sump;
   an oil tank having an oil level sensor configured to measure a level of oil in the oil tank;
   a scavenge pump, the sump connected to the oil tank through the scavenge pump and via a scavenge line;
   an indicator adapted to indicate the measured level of oil;
   a user interface configured to generate a signal when the measured level of oil is read from the indicator;
   an auxiliary pump configured to pump oil from the sump to the oil tank upon receiving the signal; and
   an auxiliary line fluidly connecting the auxiliary pump to the oil tank, the auxiliary line being distinct from the scavenge line and bypassing the scavenge pump such that the auxiliary pump is connected to the oil tank independently of the scavenge pump.

2. The gas turbine engine of claim 1 wherein the user interface is a switch configured to be automatically triggered when a moveable component is moved to access the indicator.

3. The gas turbine engine of claim 2 wherein the moveable component is a cover to a sight glass across which the indicator is visually accessible.

4. The gas turbine engine of claim 2 wherein the moveable component is an oil filler cap.

5. The gas turbine engine of claim 1 wherein the user interface is a system accessible from a cockpit to display an oil level on the indicator, the indicator being a display screen in the cockpit.

6. The gas turbine engine of claim 1 wherein the sump of the accessory gearbox is at a low point of the gas turbine engine.

7. The gas turbine engine of claim 1 wherein the oil tank is positioned above the sump.

8. The gas turbine engine of claim 1 wherein the accessory gearbox has an output shaft connected to a rotor of the compressor section and turbine section via gears and via at least one power transfer shaft.

9. The gas turbine engine of claim 8 wherein the scavenge pump powered by the output shaft.

10. The gas turbine engine of claim 1 wherein an air-oil separator is provided in the accessory gearbox.

11. The gas turbine engine of claim 1 wherein the auxiliary pump is electrically powered.

12. An oil system for an aircraft engine, comprising:
    a sump of an accessory gearbox;
    an oil tank having an oil level sensor configured to measure a level of oil in the oil tank;
    an indicator adapted to indicate the measured level of oil;
    a user interface configured to generate a signal when the measured level of oil is read from the indicator, the user interface being a switch configured to be automatically triggered when a moveable component is moved to access the indicator; and a auxiliary pump configured to pump oil from the sump to the oil tank upon receiving the signal.

13. The oil system of claim 12 wherein the moveable component is a cover to a sight glass across which the indicator is visually accessible or an oil filler cap.

14. The oil system of claim 12 wherein the user interface is a system accessible from a cockpit to display an oil level on the indicator, the indicator being a display screen in the cockpit.

15. The oil system of claim 12 wherein an air-oil separator is provided in the accessory gearbox.

16. The oil system of claim 12, comprising a scavenge pump connecting the sump to the oil tank, the auxiliary pump connected to the oil tank independently of the scavenge pump.

17. The oil system of claim 16, wherein the sump has a first outlet connected to the scavenge pump and a second outlet connected to the auxiliary pump, the first outlet distinct than the second outlet.

18. The oil system of claim 17, wherein the auxiliary pump is connected to the oil tank via an auxiliary line, the auxiliary line having has an outlet connected to the oil tank at a different location than a connection point between a scavenge line and the oil tank, the scavenge line connecting the scavenge pump to the oil tank.

\* \* \* \* \*